United States Patent [19]
Peterson

[11] 4,049,222
[45] Sept. 20, 1977

[54] EJECTOR RACK FOR NUCLEAR STORES

[75] Inventor: Paul F. Peterson, Rancho Palos Verdes, Calif.

[73] Assignee: The United States of America as represented by the Secretary of the Air Force, Washington, D.C.

[21] Appl. No.: 707,139

[22] Filed: July 20, 1976

[51] Int. Cl.² .............................................. B64D 1/04
[52] U.S. Cl. .............................. 244/137 R; 89/1.5 F; 89/1.5 G; 294/83 A
[58] Field of Search ........................ 244/137 R, 118 R; 89/1.5 R, 1.5 F, 1.5 G, 1.5 C, 1.5 H; 294/83 R, 83 A, 83 AB

[56] References Cited
U.S. PATENT DOCUMENTS

| 2,416,028 | 2/1947 | Sloan | 89/1.5 G |
| 2,491,400 | 12/1949 | Thumim | 89/1.5 G |
| 2,746,425 | 5/1956 | Schafer | 244/137 R X |
| 2,749,063 | 6/1956 | Low | 244/137 R |
| 2,756,091 | 7/1956 | Komerska | 89/1.5 R X |
| 3,010,752 | 11/1961 | Geffner | 244/137 R X |
| 3,557,550 | 1/1971 | Legarra | 244/137 R X |
| 3,799,478 | 3/1974 | Costes et al. | 244/137 R |

FOREIGN PATENT DOCUMENTS 1,174,815  3/1959  France ........................... 294/83 AB Primary Examiner—Trygve M. Blix
Assistant Examiner—Galen Barefoot
Attorney, Agent, or Firm—Joseph E. Rusz; Arsen Tashjian

[57] ABSTRACT

A 30 inch ejector rack, for use with an aircraft, to support and release and/or forcibly eject a nuclear store (or a large conventional store) from the aircraft, with both the ejector rack and the store carried internal of the aircraft. Unlike the prior art, this ejector rack structurally incorporates, among other novel fundamental features and/or improvements: mechanical "spools", rather than valves or orifices, to obtain pitch or tilt of the store during forced ejection; bypass grooves near the end (i.e., the bottom) of the piston stroke to provide snubber action, thus preventing damage to the store due to impact of the piston and the store during ejection; cartridge debris screens in the gas system of the ejection rack and, structural configuration which permits quick removal of piston components for rapid and easy cleaning, without necessitating the complete disassembly of the ejector rack, or even the removal of the rack from the aircraft to which it is attached.

8 Claims, 11 Drawing Figures

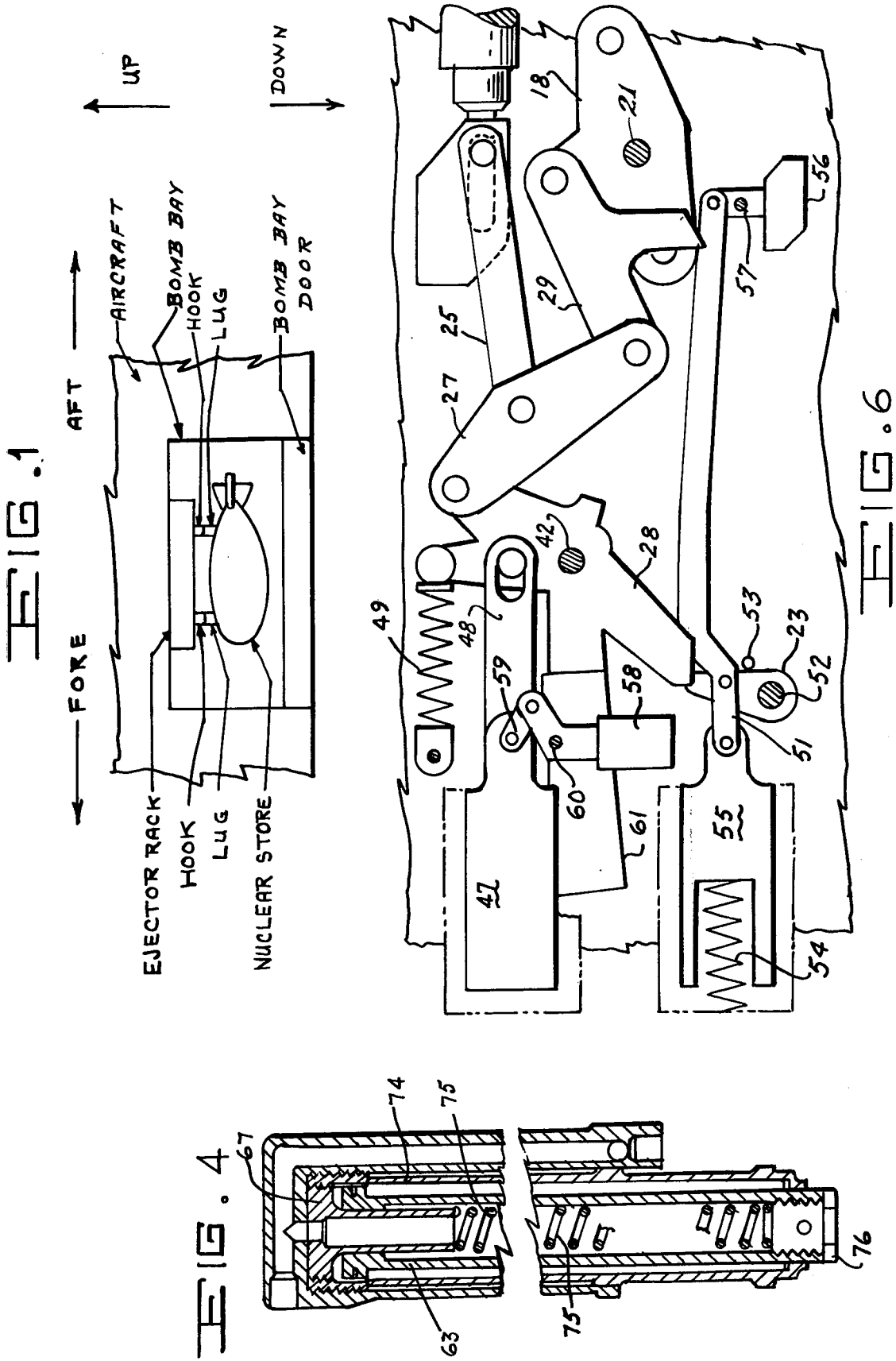

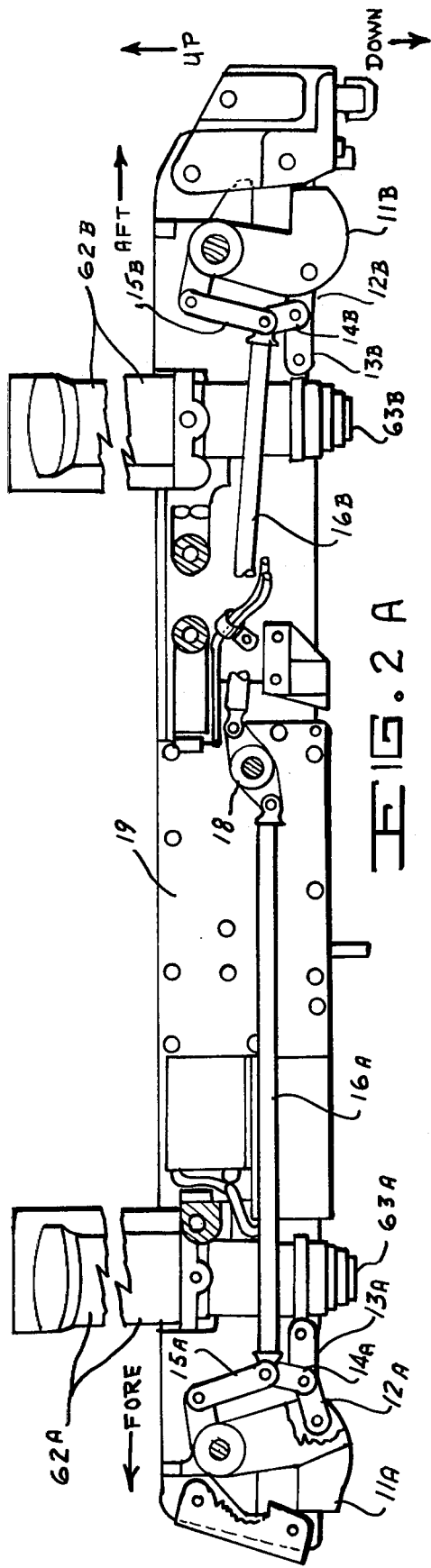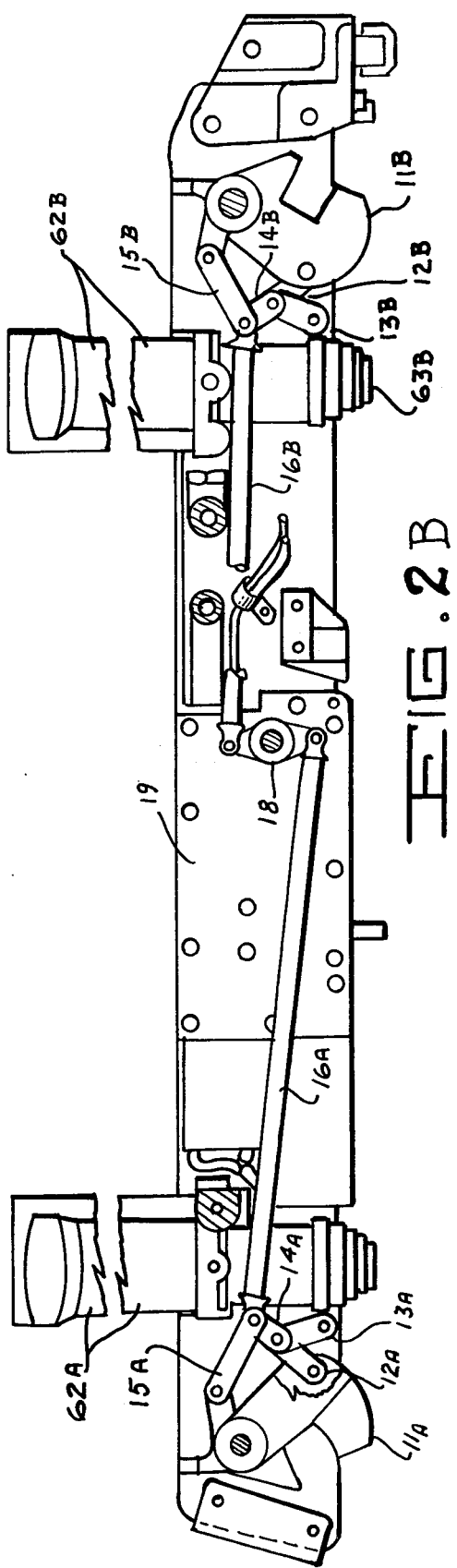

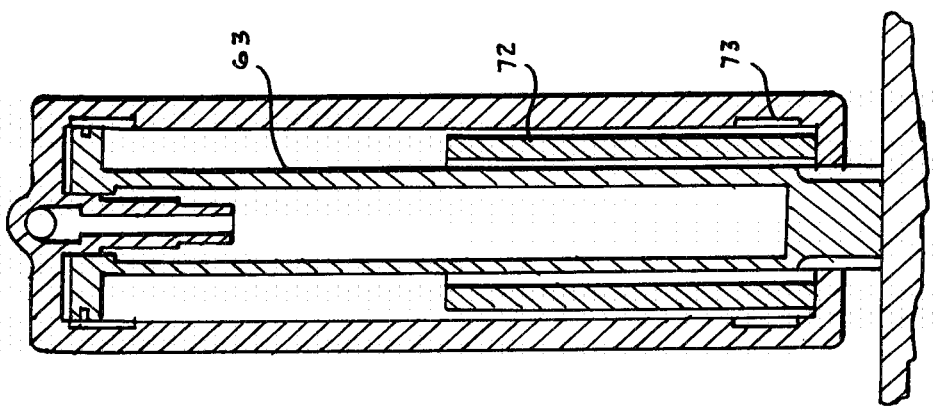
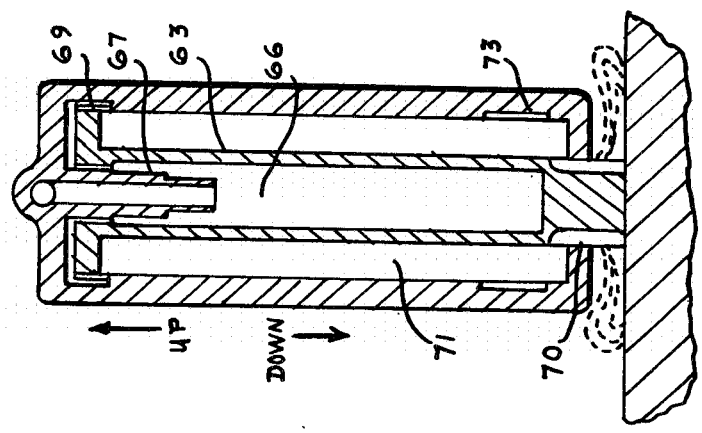
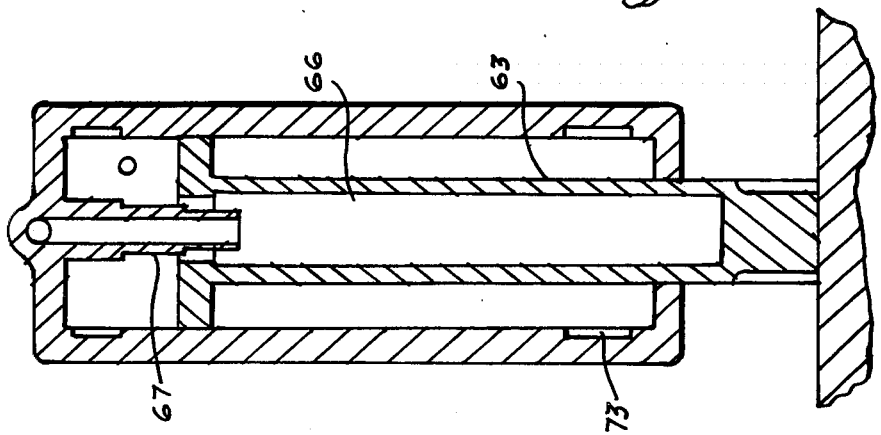
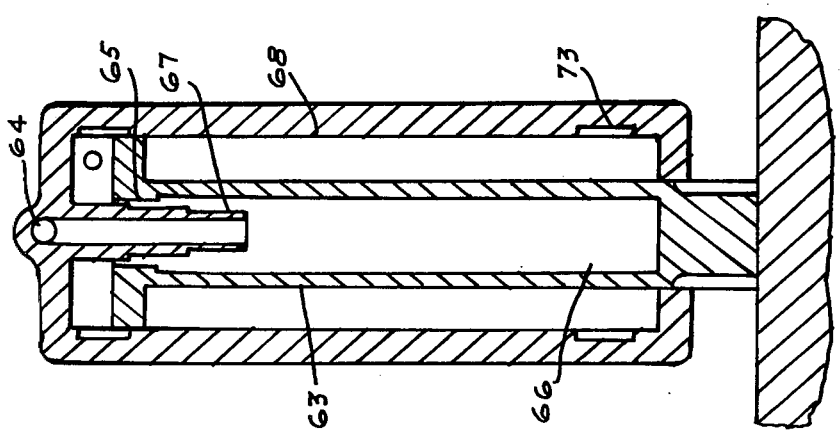

EJECTOR RACK FOR NUCLEAR STORES

STATEMENT OF GOVERNMENT INTEREST

The invention described herein may be manufactured and used by or for the Government for governmental purposes without the payment of any royalty thereon.

CROSS REFERENCE TO RELATED APPLICATION

This application is closely related in subject matter to copending patent application, entitled "Ejector Rack", of which the applicant herein is the common inventor. Among other significant differences between my two ejector racks, the novel ejector rack shown and described in that copending patent application is not suited for use in suspending, releasing and/or forcibly ejecting a nuclear store, whereas the ejector rack shown and described herein is ideally suited for such use.

BACKGROUND OF THE INVENTION

This invention relates to ejector racks and, more particularly, to a novel ejector rack of the 30-inch type which is ideally suited for use in supporting, releasing and/or forcibly ejecting nuclear bombs, large conventional bombs, and some large nuclear and non-nuclear missiles from an aircraft, with the ejector rack and the store carried internal of the aircraft, and with the ejector rack attached to the aircraft.

It is well known in the art that the principle problems with regard to the use of prior art ejector racks of the type above-described as are follows:

Firstly, existing racks of this type do not provide sufficient separation velocity for the stores mounted to them. With aircraft flying at higher speeds under higher aerodynamic pressures, more velocity is required to separate the store from aircraft as it flies through the aerodynamic flow field surrounding the aircraft.

Secondly, existing racks of this type also impart very high forces to the store being ejected for very short periods of time, such as 2 or 3 milliseconds. This causes the weapon designer to add heavy structure to the rack in order to accept the high peak forces.

Thirdly, existing racks of this type which incorporate release linkages and nuclear safety interlocks are subjected to high vibration loads which can sometimes inadvertently release the weapons.

Fourthly, most of the current weapon ejection devices used for large stores are extremely heavy and inefficient.

My inventive 30-inch ejector rack structurally incorporates a number of a new structure concepts (in the form of fundamental features and/or significant improvements) that counteract the above-mentioned problems of the prior art; and, additionally, my 30-inch ejector rack also incorporates other fundamental features that are significant, novel, and attain long-sought goals.

Some of these new structural concepts and other significant features are as follows:

Firstly, the inventive ejector rack embodies mechanical devices which control ejector gases, so that the high short time peak load is avoided. Instead, a lesser peak load is maintained for a longer period of time, such as 30 to 40 milliseconds. This provides for high store ejection velocity, while imparting much smaller loads (than now exist) to the store.

Secondly, the rack embodies a counterbalance system, which includes a plurality of counterweight assemblies that offsets the effect of vibration loads tending to release a store through inadvertent action of the linkage and trigger mechanism. The total mass of the counterweights is essentially the same as the mass of the linkage which can cause the inadvertent release of the store.

Thirdly, the rack incorporates a novel bypass system which comes into usage when the ejector gas-generating cartridges are inadvertently fired. This bypass system allows ejector gases to be channeled around the head of the piston, and then through additional bypass grooves in the bottom of the piston shank. This provides that the forces applied to the store being carried are less than the forces that are normally applied (and are necessary) during the ejection cycle.

Fourthly, the rack also incorporates mechanical "spools" under the piston head to effect a pitch rate, or a tilting, of the store during ejection. This is sometimes required to achieve adequate separation characteristics. The use of spools is novel in the art, as opposed to the use of orifices in prior art racks. The spool technique provides no change to the gas dynamics of the system, as is inherent with orifices and other gas diverging devices. Also, the spools do not wear or erode as orifices do.

Fifthly, another structural feature of the rack is a piston deceleration bypass groove which decelerates the piston at the bottom of its stroke, preventing damage due to impact.

Sixthly, still another structural feature of the rack is novel configuration of component members which permits the piston and the cylinder to be removed as a unit for cleaning, without the disassembly or removal of the rack from the aircraft to which it is attached.

By virtue of all of the foregoing, my novel 30-inch ejector rack constitutes a significant advance in the state-of-the-art.

SUMMARY OF THE INVENTION

This invention relates to a novel 30-inch ejector rack that is particularly well suited for suspending, releasing and/or forcibly ejecting a nuclear bomb, a large conventional bomb, and nuclear and non-nuclear missiles (all of which will be referred to hereinafter as a "store") from a location internal of an aircraft, such as a bomb bay.

Accordingly, it is an object of this invention to provide such an ejector rack.

Another object is to provide an ejector rack that embodies a counterbalance system which offsets the effect of vibration loads which otherwise would result in the inadvertent and undesired release of the store.

Still another object is to provide an ejector rack that incorporates a gas bypass system to prevent release and forced ejection of the store when the ejector cartridges are inadvertently fired.

Yet another object of this invention is to provide an ejector rack which uses mechanical spools to effect a pitch rate or a tilting of the store during ejection.

Yet still another object of this invention is to provide piston deceleration bypass grooves to decelerate the ejector pistons at the bottom of their strokes to prevent damage to the store due to impact of the piston with the store at forced ejection.

A further object is to provide an ejector rack in which each piston and its respective cylinder may be removed from the ejector as a unit for cleaning, without other disassembly or removal of the rack from the aircraft.

These objects, as well as other related and equally important objects, of this invention will become readily apparent after a consideration of the description of my invention, together with reference to the Figures of the drawings.

DESCRIPTION OF THE DRAWINGS

FIG. 1 is a side elevation view in simplified schematic form, partially in cross section and partially fragmented, of an aircraft in the interior of which is attached my inventive ejector rack from which is releasably supported a representative nuclear store;

FIGS. 2A and 2B are side elevation views, in simplified pictorial form, of a preferred embodiment of my inventive ejector rack (for nuclear stores), with one side plate thereof removed, showing primarily the different positional relationships of the components of the rack in the hooks-closed (i.e., up) mode and in the hooks-open (i.e., down) mode;

FIGS. 4, 5A, 5B, 7 and 8 are various side elevation views (not to scale), in simplified form and partially in cross section, of the ejecton pistons components (and elements related thereto) and of the piston deceleration bypass grooves; and, FIG. 6 is a side elevation view, in simplified form, of the counterbalance system of the rack.

Figure 3A:
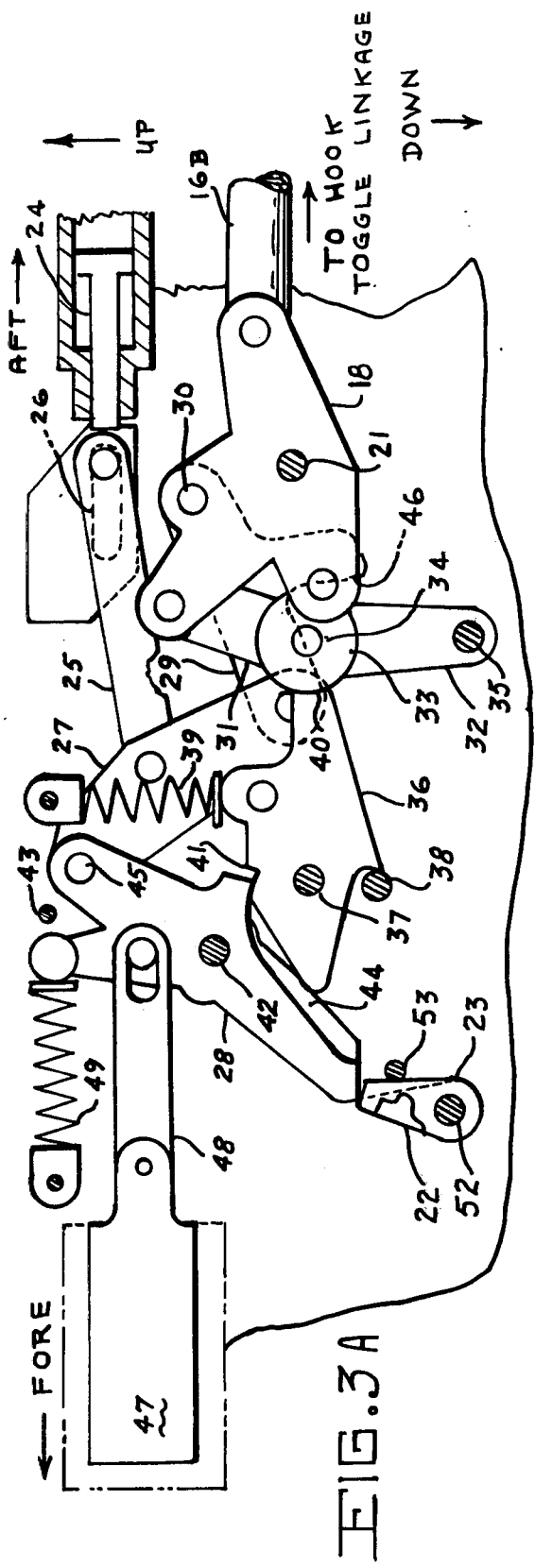
FIGS. 3A and 3B are side elevation views, partially in simplified pictorial form and partially in schematic form, of a portion of the preferred embodiment, enlarged and in detail, showing primarily the trigger mechanism constituent component in, respectively, the hooks-closed and the hooks-open modes, and also showing the in-flight gravity release assembly, and part of the forced ejection means.
Figure 3B:
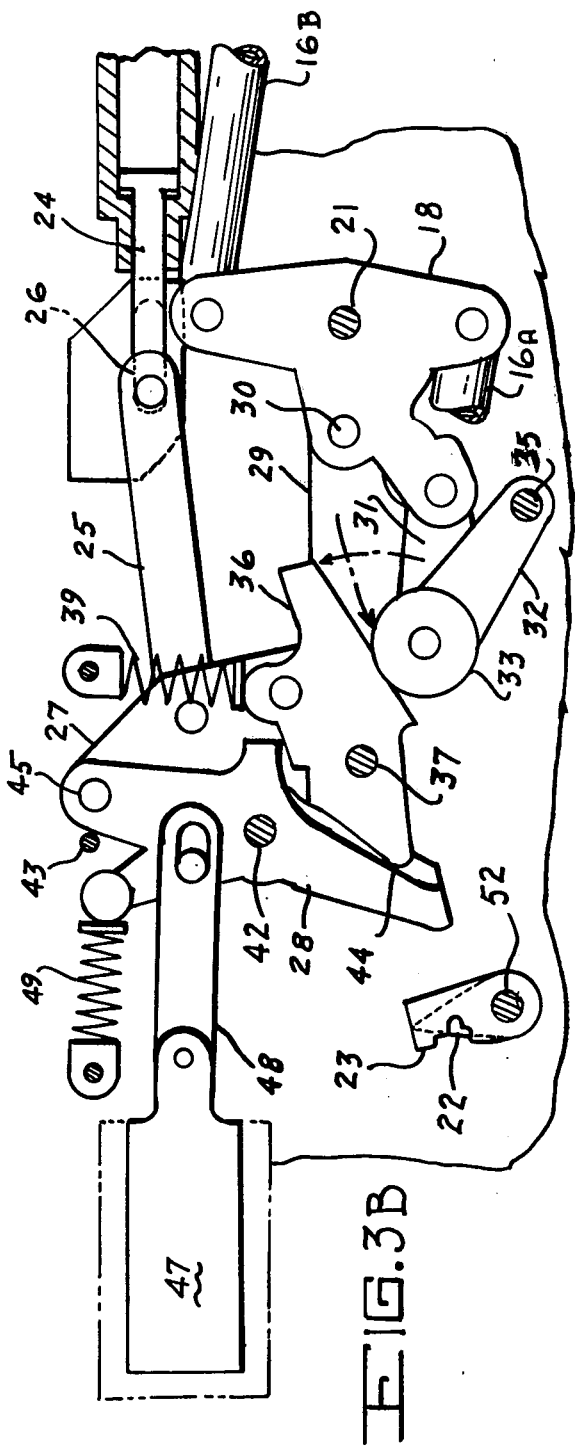

In this regard, and with reference to said FIG. 6, and also to FIGS. 3A and 3B, certain links and bellcranks are shown differently, as a matter of draftsman's simplification, in the interest of maintaining clarity of positional relationship of other components in said FIGS. 6, 3A and 3B.

DESCRIPTION OF, AND MANNER OF OPERATION OF, THE PREFERRED EMBODIMENT

In the interest of brevity, a description of the preferred embodiment of my ejector rack will be combined with a description of the manner of operation of the preferred embodiment.

In that regard, it is to be noted that in FIGS. 2–8, inclusive, the same means, components, and the like have the same reference numerals, designations, and the like throughout all of the Figures of the drawings. Further, in some of the Figures of the drawings, the directional designations "Fore", "Aft", "Up" and "Down" are shown, together with an appropriately pointing arrow for each designation, to better orient the reader.

Additionally, and in oversimplification, it may be said that my herein-described and shown aircraft ejector rack for removably engaging nuclear stores not only is inventive per se in the art, but also is a significant improvement in some respects over my ejector rack (hereinafter referred to as "my non-nuclear ejector rack") that is described and shown in my copending application, entitled "Ejector Rack".

This inventive ejector rack, just as my previously taught non-nuclear ejector rack, comprises (in a generic sense) the following: means for releasably supporting the store which is removably engaged to the ejector rack; means for selectively ejecting the store forcibly from the rack (and from the aircraft); and, means for attaching the support means and the ejection means to an aircraft, with this attaching means also functioning as a housing means for the support means and the ejection means. However, generally speaking, unlike my non-nuclear ejector rack this nuclear ejector rack includes, but is not limited to the following novel fundamental features: two safety locks, rather than one, with one of the two locks being an in-flight reversible lock for nuclear store safety (i.e., a "nuclear safety interlock"); a counterbalance system which includes a plurality of counterweight assemblies, rather than one assembly with one counterweight; mechanical spools to effect pitch rate and tilt of the ejected store; piston deceleration bypass grooves to provide snubber action and, thereby, prevent damage to the store and/or its casing or housing when the piston impacts with the store to forcibly eject it from the rack; debris screens to prevent the fouling and obstruction of gas passageways and lines due to debris resulting from the firing of gas-generating propellant cartridges; and, unique configuration and structure of the ejector pistons and components thereof to permit rapid removal from the ejector rack without having to remove the ejector rack from the aircraft, and without having to completely disassemble the ejector rack.

With reference to FIG. 1, therein is shown, in very simplified and schematic form, an aircraft in the interior of which (e.g., in the bomb bay) is attached my ejector rack which, in turn, is releasably supporting a representative nuclear store having a plurality of lugs by which the nuclear store is removably engaged to hooks which are components of the ejector rack.

For ready reference the aircraft, the bomb bay and one of the doors thereof, the ejector rack and hooks thereof, and the nuclear store and the lugs thereof have all been identified by labelling, rather than being designated by reference numerals. Additionally, to better orient the reader, the directional designations Fore, Aft, Up and Down are shown, together with an appropriate arrow for each designation.

With reference to FIGS. 2A and 2B, these Figures (and a comparison thereof) show a preferred embodiment 10 of my inventive nuclear ejector rack with one side plate removed.

Here, also to better orient the reader, the directional designations Fore, Aft, Up and Down are shown, together with an arrow for each designation, just as they were shown in FIG. 1.

In FIG. 2A the hooks are in the closed or store-carrying position (i.e., hooks-up mode). The plurality of hooks, preferably two (such as fore hook 11A and aft hook 11B), are oppositely disposed and are configurated and dimensioned to accept and to removably engage the store by its store lugs, FIG. 1, with the hooks 11A and 11B at a preselected distance for each other, preferably 30 inches (which is the current spacing of lugs on nuclear stores, large conventional bombs, and the like). The hooks 11A and 11B are attached, respectively, to load reducing toggle linkages 12A, 13A, 14A and 15A and 12B, 13B, 14B and 15B that, in turn, are attached, respectively, to interconnecting compression links (or tubes) 16A and 16B, which said interconnecting links are fastened to a central bellcrank 18 that is controlled by a suitable means (i.e., a trigger mechanism) within control box (or trigger box) 19.

In FIG. 2B are shown the same components shown in FIG. 2A, except that the hook 11A and 11B are now in the open position (i.e., hooks-down mode), having just released a store and/or ready for the loading of a store.

The control box 19 (or trigger box), FIGS. 2A and 2B, contains all of the locking and opening devices for the rack in an enclosed housing. Two safety locks (a first safety lock and a second safety lock) are provided to prevent unintentional release and/or forced ejection of a suspended store. Each lock is adequately strong to prevent release and/or forced ejection of the store, even if gas-generating cartridges (that are used in the ejection means component of the rack) should be inadvertently ignited. One lock (the second safety lock) is solenoid operated, and serves as an in-flight reversible lock for nuclear store safety. The other lock (the first safety lock) is mechanically operated by a lever which protrudes from the side of the rack, and is primarily intended for ground handling safety, although it is also used as an additional in-flight safety lock where mechanical means for its operation are provided. A solenoid-actuated system (hereinafter referred to as the "gravity release assembly") is provided as an additional means of release if, for some reason, the normal gas-operated ejection means should fail to function.

With reference to FIGS. 3A, the control means (hereinafter referred to as the "trigger mechanism") is shown schematically in the locked position. In this position, the hooks 11A and 11B are closed (i.e., up), as shown in FIG. 2A, and are held in this position by central bellcrank (or main bellcrank) 18, acting on interconnecting compression links 16A and 16B. The main bellcrank 18 consists of two sets of clevis arms inside the trigger housing, extending from a shaft 21, which protrudes from the trigger housing on each side to support external crank arms. These crank arms are splined to shaft 21, to rotate with bellcrank 18 as a unit. For simplicity, in FIGS. 3A, 3B and 6, the crank arms are shown as part of bellcrank 18. The interconnecting compression links, such as 16B, are attached to external crank arms. As long as the bellcrank 18 is prevented from rotating counterclockwise, the hooks 11A and 11B, FIG. 2A, are kept closed. The trigger mechanism within the trigger housing 19, FIGS. 2A and 2B, therefore, is primarily concerned with controlling the rotation of this bellcrank 18. One of the clevis arms of the bellcrank 18 is pinned to link 31. This link 31 forms a toggle with link 32. A heavy duty needle bearing roller 32 is provided at the juncture of these two links 31 and 32, and is secured to the links 31 and 32 with a hardaned steel pin 34. Link 32 pivots about a shaft 35 which is fixed to the trigger housing 19, FIGS. 2A and 2B. Rotation of bellcrank 18 is prevented by the trigger 36 which blocks the roller 33, keeping the toggle links 31 and 32 closed. The trigger 36 rotates about a shaft 37 fixed to the trigger housing 19, FIGS. 2A and 2B, and is held in the locked position against a stop 38 by dual concentric springs 39.

Still with reference to FIG. 3A, the locking face 40 of the trigger 36 is a radius ground slightly off-center with respect to its center of rotation. This produces a self-locking feature in the following manner: Work loads impart a counterclockwise movement to bellcrank 18 through links 16A, 16B, 12A, 12B, 13A, 13B, 14A, 14B, 15A and 15B, FIG. 2B. This movement causes the roller 33 to exert force on the trigger 36 at face 40 through the action of toggle links 31 and 32. The roller force is directed through the center of the radius (of locking face) 30 which is slightly below the center of shaft 37, inducing a clockwise moment to the trigger 36. This maintains the trigger 36 in the locked position, as shown in FIG. 3A, against the stop 38. In addition to this self-locking feature, the trigger 36 is also held in position by the release pawl 28 which blocks rotation of the trigger 36 at the abutting surfaces 31 on release pawl 28 and trigger 36. The release pawl 28 pivots about a shaft 42 which is supported by the trigger housing, and is held in the locked positioned by dual concentric springs 49. Two independent locking pawls 22 and 23, which are the two safety locks previously described herein, maintain the release pawl 28 in the locked position.

With reference to FIG. 3B, and also with reference to forced ejection of the suspended store, the ground safety lock 22 (the first safety lock) and the in-flight reversible lock (i.e., the nuclear store interlock) 23, the second safety lock, must both be in the unlocked position, as shown in FIG. 3B, to effect forcible ejection. For normal forced ejection of the store, an electrical firing signal (generated and delivered by suitable conventional means) is delivered to either or both of two gas-generating propellant cartridges (not shown) which are positioned in gas system which is a component of the ejection means of the ejector rack. Upon ignition, the cartridge(s) generate high pressure gas, some of which is directed behind an actuator piston (or unlocking piston) 24, causing it to exert force on a push rod (or sliding rod) 25. One end of the push rod 25 rides in a fixed slot 26. The other end is pinned to link 27, and causes it to move in a path controlled by the release pawl 28 and link 29, each of which is pinned to link 27. The other end of link 29 is pinned to the main bellcrank 18 at pin 30. Since bellcrank 18 is initially locked, pin 30 acts as a stationary pivot for link 29, until the bellcrank 18 is free to move. As this linkage is set in motion, link 29 rotates clockwise about pin 30, and pawl 28 rotates counterclockwise about pin 42 until it hits a positive stop 43. As pawl 28 rotates, it first unlocks the trigger 36 at surfaces 31. Continued rotation brings a camming surface into contact with the trigger 36 at surface 44 which rotates the trigger 36 counterclockwise, releasing the roller 33. As the piston 24 continues to move, the push rod 25 drives link 27 in a clockwise direction around pin 45 which now acts as a fixed pivot, since the pawl 28 has come to rest. With the roller 33 no longer blocked, the bellcrank 18 is free to rotate. As link 29 rotates clockwise around pin 30, a tang 46 strikes the toggle joint near pin 34 which helps set the toggle in motion. As link 27 starts its clockwise rotation around pin 45, it pulls link 29, causing the released bellcrank 18 to rotate counterclockwise. This motion continues until the linkage reaches its fully travelled position, as shown in FIG. 3B. In this position, the hooks are fully open and are maintained open by piston 24.

With reference to FIGS. 3A and 3B, and also with reference to the gravity release assembly referred to earlier herein, a suspended store may be released in flight by an alternate method (i.e., rather than by forced ejection). This release of the store may be accomplished by energizing the release solenoid 47, shown in FIGS. 3A and 3B. Upon being energized, the solenoid 47 pushes on link 48 which rotates the release pawl 28 in a counterclockwise direction against its stop 43. This action unlocks the trigger 36, at abutting surfaces 40, FIG. 3A; raises the trigger 36 off the roller 33; and, causes the tang 46, FIG. 3A, to nudge the toggle joint near pin 34, FIG. 3A. The hooks are thus unlocked and free to open; and, the weight of the store acting on the unrestrained hooks effects the release.

In summary, and with reference to FIGS. 2A, 2B, 3A and 3B, forced ejection of a suspended store is effected by propellant gas from cartridges which results in a pressure build-up, providing force on unlocking piston 24 causing it to move outward (i.e., fore) in its housing, thereby providing force on sliding rod 25 which, in turn, pushes the release pawl 28 lifting the trigger 36 from the locking mechanism, rotates the lock mechanism and the link 29 which strikes the last stage toggle. Further travel of the unlocking piston 24 drives the main bellcrank 18 which induces and sustains an opening moment on hooks 11A and 11B, releasing the store. Concurrently, gas is manifolded to the ejector piston housing 62A and 62B where the pistons are forcefully extended, causing forcible ejection of the store because of the piston-to-store impact, simultaneously with the opening of hooks 11A and 11B.

With reference to FIG. 6, and the counterbalance system previously mentioned herein, in order to provide a securely locked store during flight when the ground safety lock 22, FIGS. 3A and 3B, is in the unlocked position, a counterbalance system (which is a component of the support means) is provided to cancel the effect of "G" forces. Three separate linkage assemblies in this rack are balanced in this manner, and are shown in FIG. 6. In the in-flight reversible lock assembly (i.e., the nuclear safety interlock) 23, a solenoid 55 controls a locking pawl through link 51. The pawl 23A rotates about its shaft 52, and is held against a stop 53 by dual concentric springs 54 in the solenoid 55. Acceleration of the rack in the aft direction can impart an acceleration force on the solenoid core 55A, pawl 23A and link 51 in the forward direction which can induce an unlocking (i.e., counterclockwise) moment on the pawl 23A. To prevent the pawl 23A from unlocking, a first counterweight 56 is provided. This counterweight 56 rotates about a second shaft 57, and is tied to the mechanism by an extension of link 51. This counterweight assembly is designed and structured so that, with acceleration of the rack in either the fore or aft direction, the sum of the moments taken about second shaft 57 is zero.

Again with reference to FIG. 6, in the gravity release assembly, the mass of the solenoid core 47 and link 48 are balanced by second counterweight 58 which is attached to the mechanism by link 59. This assembly is designed and structured so that accelerations in either the horizontal or vertical direction (i.e., upwardly, downwardly, fore, or aft) produce a moment of zero at third shaft 60.

Still with reference to FIG. 6, the (trigger) release linkage assembly has four components which, when unlocked, are restrained only by the dual concentric springs 49. These components (i.e., push rod 25, links 29 and 27, and pawl 28) are balanced by third counterweight 61 located on an extension of pivot shaft 42. This assembly is designed so that accelerations in either the horizontal or vertical direction (i.e., upwardly, downwardly, fore, or aft) result in a moment of zero at pivot shaft 42.

Accordingly, G forces resulting from vibration or shock loads, therefore, will, not exert unlatching or unlockiing forces on any of the mechanisms in the rack.

Now, with reference to FIG. 4, which is a cross sectional view of one of two similar ejector piston assemblies of the ejection means of my rack 10. FIG. 1, 2A and 2B, the piston 63 is spring loaded against the store to prevent impact loads on the store during forced ejection, but is not retractable after ejection. An unusual performance condition in the ejector rack has been developed embodying a relatively long-peak flat-top thrust-time curve.

How this is done is shown in FIGS. 5A and 5B, where at the start of the stroke propellant gas enters the port 64 into a small cavity 66 inside the piston 63. Initially, the gas pressure is relatively high, but the effective piston area is small (i.e., approximately the inside diameter 65 of the piston 63). As the piston 63 starts to move downwardly, the increase in volume tends to reduce the pressure. In order to compensate for this pressure reduction, a probe 67 allows gas to act on the top of the piston 63 in increasing quantities after predetermined increments of piston travel, which gradually increases the effective piston area (i.e., to the diameter of the bore at 68). This pressure control decreases the initial peak force and, more importantly, sustains a high working force for the duration of the stroke. The result is that, for a given stroke, more energy is delivered to the store; and hence, higher ejection velocities are attained.

Another feature of this ejector rack is the low peak force generated in the unlikely event that "locked-up" firing occurs (i.e., if, and when, the ejector rack should fail to eject the store, even though the propellant gases have been generated in the ejection means). The results of this phenomenon is shown in FIG. 7 and is accomplished by the use of small ("top") bypass grooves 69 cut locally into the upper portion of the cylinder wall adjacent to the piston head in the up position and the use of small ("bottom") bypass grooves 70 also cut around the bottom into the lower portion of the piston cylinder (and of the piston) at 70. This allows the high pressure gas to bleed around the probe 67, over the top of the piston 63, through the top bypas grooves 69, down the main portion (i.e., the interior) 68 of the cylinder, and overboard to atmosphere through the bottom bypass grooves 70 at the bottom of the piston 63. This assures that the pressure buildup on the head of the piston 63 will not exert sufficient load on the store (casing), to cause damage. Also, the confined gas pressure cannot damage the manifold and the tubes. In the normal ejection cycle these bypass grooves 69 and 70 quickly seal with piston motion and have no effect on the normal ejection of the store.

The means for creating pitch of the store generally fall into orificing of the gases or mechanically destroking the pistons. The orifice technique is usually unsuitable; since it results in unmanageable breech pressures. Therefore, I use a spool technique, as shown in FIG. 8, where a tubular member 72 (hereinafter referred to as a spool) is installed beneath the head of the piston 63 at either the fore end or the aft end of the ejector to limit piston travel and, thereby, to produce pitch of the store at either the fore end or the aft end of the store, as desired. This method of pitch control does not increase breech pressures, as other methods do.

FIGS. 4, 5A, 5B, 7 and 8 all show another unique feature of this ejector rack (i.e., piston deceleration bypass grooves 73 cut into the cylinder near the bottom of the cylinder). These grooves 73 (located downward of the top bypass grooves 69 and upward of the bottom bypass grooves 70 will be referred to hereinafter as the "intermediate grooves") allow high pressure gases to leak around the piston head, and become trapped beneath the piston head, as the piston 63 approaches the end of downward travel. As the piston 63 travel downward in the cylinder, the trapped gases are compressed between the lower side of the piston head and the bottom of the cylinder, thus providing a deceleration cushion (i.e., snubber action) for the piston 63 and also preventing damage due to impact. At completion of the stroke, the gas bleeds to atmosphere around the piston shank.

As previously stated, another unique feature of this rack is the novel configuration of component members which permits easy removal of piston components for quick and easy cleaning without complete disassembly of the ejector rack and without removal of the ejector rack from the aircraft. Stated another way, maintenance of the ejector piston cylinder is very simple, because complete disassembly is basically unnecessary. For normal maintenance, the piston, probe, and cylinder can be removed as an integrated unit for cleaning or other maintenance, without other disassembly, and without removal of the ejector from the aircraft. All of the trigger parts are housed in a dust-free box, and since a propellant screen (which is to be discussed later herein) eliminates downstream debris, infrequent cleaning is all that is necessary. With reference to FIG. 4, one can see from that Figure that the piston 63, the probe 67, the cylinder 74, the spring 75, and the end plug 76 can be removed as a single (integrated) unit for ease of cleaning and other maintenance, without any other disassembly of the rack or removal of the rack from the aircraft. Once the above-described integrated unit is removed, it is a simple operation to disengage the separate items for individual cleaning, replacement, and other maintenance.

Another unique feature of this ejector is the use of cartridge debris screens. Occassionally during a firing sequence some debris in the form of plastic and metal may be expelled from the cartridges and could travel downstream in the gas passages of the ejector system of the rack, thereby causing obstruction(s) and, at a subsequent firing, damage or destruction of the rack. To prevent the travel of any of this debris I interpose debris screens between each cartridge and the manifold. This does not restrict gas flow, but does retain any debris.

CONCLUSION

It is clear from all of the foregoing description, and from the contents of the Figures of the drawings herein, that the previously stated objects of my invention have been achieved. Additionally, related desired objects also have been achieved. For example, most current rack ejectors weigh in the order of 100 to 125 pounds, including sway bracing provisions to prevent motion of the store on the ejector rack in flight. Including the increased performance characteristis, plus all of the added features outlined above, but excluding sway bracing provisions, this rack weighs 54.5 pounds, or about half the weight of the other ejectors which embody only half of the power of this ejector.

It is to be noted that, although there have been described the fundamental and unique features of my inventive ejector rack as applied to a particular preferred embodiment, various other embodiments, adaptations, substitutions, additions, omissions, and the like will occur to, and can be made by, those of ordinary skill in the art, without departing from the spirit of my invention.

What is claimed is:

1. An ejector rack for releasably supporting, and for selectively ejecting forcibly, a nuclear store from an aircraft, wherein said store has a plurality of lugs from which said store is removably engaged with and to said ejector rack, comprising:
   a. means for releasably supporting said removably engaged nuclear store by said store lugs, wherein said support means includes:
   1. two oppositely disposed hooks configured and dimensioned to accept and to removably engage said nuclear store by said store lugs, with said hooks at a distance of 30 inches from each other;
   2. suitable dimensioned and configured linkage, disposed between, and interconnecting, said oppositely disposed hooks, whereby said responsive simultaneously to any movement of said interconnecting linkage;
   3. means, connected to said interconnecting linkage, for moving said interconnecting linkage to effect simultaneous movement of said hooks downwardly to close said hooks and thereby to removably engage said nuclear store and said store lugs by said hooks, and also to effect simultaneous movement of said hooks upwardly to open said hooks and thereby to disengage and to release said store lugs and said nuclear store from said hooks, wherein said interconnecting linkage moving means includes a centrally located, pivotally movable main bellcrank;
   4. means, connected to said interconnecting linkage, for selectively preventing any movement of said interconnecting linkage, wherein said linkage movement prevention means includes:
   aa. a first safety lock assembly that further includes a first locking member pivotally rotatable about a first shaft, with said first locking member selectively movable to a lock position and to an unlock position;
   bb. a second safety lock assembly that further includes a second locking member pivotally rotatable about said first shaft independently of said first locking member of said first safety lock assembly, with said second locking member aligned with said first locking membe, and with said second locking member selectively movable to the same lock position, and also to the same unlock position, as said first locking member, and also with said second safety lock assembly operatively associated with said first safety lock assembly;
   cc. and, a plurality of iinterlinked components common to both said first locking member of said first safety lock assembly and said second locking member of said second safety lock assembly, wherein said interlinked components common to both locking members and both lock safety assemblies include:
   11. a pivotally movable release pawl component selectively abutable by either and both of the locking members, with said release pawl having a lock position and an unlocked position;
   22. and a pivotally movable trigger component selectively abuttable by said release pawl component, with said trigger component linked to said main bellcrank of said interconnecting linkage movement means;
   whereby, when both said locking members of said safety lock assemblies are moved to said lock position, said release pawl component locks with said trigger component, and said trigger component locks with said common interlinked components, and said common interlinked components lock with said main bellcrank, thereby preventing any movement of said interconnecting linkage of said support means, and thereby preventing release and ejection of a nuclear store supported and engaged by said hooks of said support means;

5. and, means connected to said interconnecting linkage moving means, for preventing acceleration forces from acting on said interconnecting linkage moving means and inadvertently causing said interconnecting linkage moving means to move said interconnecting linkage to open said hooks and thereby to disengage and to release said store lugs and said nuclear store from said hooks, wherein said inadvertent release prevention means includes a counterbalance system which further includes a plurality of counterweights having a total mass which is equal to a total mass of those components which can cause the inadvertent release of said supported and engaged nuclear store;

b. means for selectively ejecting said nuclear store forcibly, with said ejection means operatively associated with said support means, wherein said ejection means includes:

1. a plurality of ejection piston cylinders connected to said attachment means, with each said cylinder of said plurality of ejection piston cylinders having an upper portion, a metering probe disposed within said cylinder and releasably connected to the upper portion of the cylinder, and an open-ended lower portion;

2. a plurality of ejection pistons, with a piston for each of said plurality of ejection piston cylinders, and with each said piston of said plurality having a head with an opening therein, with said opening dimensioned and shaped to accept said metering probe of said cylinder, and with said metering probe removably fitted into said piston head opening;

3. a plurality of ejection piston cylinder lower end plugs, with an end plug for closing the open-ended lower portion of each cylinder of said plurality of cylinders, and with each said end plug removably fitted into the open-ended lower portion of its respective cylinder;

4. and, a plurality of ejection piston cylinder springs, with a spring for each of said plurality of ejection piston cylinders, and with each such spring disposed internal of its respective cylinder, and also with each said spring interposed between and captured by its respective metering probe and its respective end plug;

c. and, means for attaching said support means and said ejection means to said aircraft, with said attachment means also functioning as a housing means for said support means, said ejection means, and said attachment means.

2. An ejector rack, as set forth in claim 1, wherein said first shaft of said interconnecting linkage movement prevention means is affixed to said attachment means of said ejector rack.

3. An ejector rack, as set forth in claim 2, wherein said support means includes a gravity release assembly for releasing a suspended nuclear store, without forcibly ejecting said store, while the aircraft is in flight, wherein said gravity release assembly includes a solenoid having a plurality of ends, and a link connected at one end to said solenoid, and connected at another end to said release pawl component;

whereby, when said solenoid is energized, said solenoid pulls on said link which rotates said release pawl component to said unlock position, thereby resulting in the unlocking of said plurality of hooks, and the subsequent release of said suspended nuclear store.

4. An ejector rack, as set forth in claim 3, wherein said counterbalance system of said inadvertent release prevention means includes:

a. a first counterweight rotatable about a second shaft and linked to said second locking member of said second safety lock assembly, whereby with acceleration of said ejector rack forwardly or backwardly, a sum of moments taken about said second shaft of said first counterweight is zero;

b. a second counterweight, rotatable about a third shaft and linked to said gravity release system, whereby with acceleration of said gravity release upwardly, downwardly, fore and aft, a sum of moments taken about said third shaft is zero;

c. and, a third counterweight, rotatable about a fourth shaft and linked to said release pawl component having a pivot shaft, whereby with acceleration of said ejector rack upwardly, downwardly, fore and aft, a sum of moments taken about said pivot shaft of said relese pawl component is zero.

5. An ejector rack, as set forth in claim 1, wherein each said ejection piston cylinder of said ejection means has a plurality of top bypass grooves and a plurality of bottom bypass grooves, and further includes a plurality of intermediate bypass grooves disposed within, and cut in, said ejection piston cylinder between said top bypass grooves and said bottom bypass grooves of each said cylinder, thereby providing a deceleration cushion for each said ejection piston, whereby damage to said releasably supported nuclear store during forcible ejection by said ejection pistons, due to impact of said ejection pistons and said nuclear store, is prevented.

6. An ejector rack, as set forth in claim 1, wherein a spool component is disposed within an ejection piston cylinder of said ejection means, and is simultaneously disposed between said head of said ejection piston and said lower portion of said ejection piston cyinder, whereby travel of said ejection piston within said cylinder is limited, thereby producing a pitch of said releasably supported nuclear store when said store is forcibly ejected from said ejector rack without increase of pressure within said cylinder.

7. An ejector rack, as set forth in claim 1, wherein said ejection piston cylinder, said metering probe, said ejection piston, said ejection piston cylinder spring, and said ejection piston cylinder end plug are configurated, dimensioned and structured to form an integrated unit, thereby permitting removal of said cylinder, said probe, said piston, said spring, and said end plug as one unit from said ejector rack, whereby removal of said ejector rack is obviated for maintenance of said cylinder, said probe, said piston, said spring, and said end plug.

8. An ejector rack, as set forth in claim 4, wherein said second shaft, said third shaft, and said fourth shaft are affixed to said attachment means of said ejector rack.

* * * * *